(12) United States Patent
Johnson et al.

(10) Patent No.: US 6,815,399 B1
(45) Date of Patent: Nov. 9, 2004

(54) SHEAR-SENSITIVE PLUGGING FLUID FOR PLUGGING AND A METHOD FOR PLUGGING A SUBTERRANEAN FORMATION ZONE

(75) Inventors: Les Johnson, Grande Prairie (CA); Kamal Arsanious, Edmonton (CA); David Quinn, Versoix Genève (CH); Patrick Murphy, Calgary (CA); Allen R. Toney, Red Deer (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/980,463

(22) PCT Filed: Jun. 3, 1999

(86) PCT No.: PCT/EP99/03946

§ 371 (c)(1),
(2), (4) Date: Jun. 17, 2002

(87) PCT Pub. No.: WO00/75481

PCT Pub. Date: Dec. 14, 2000

(Under 37 CFR 1.47)

(51) Int. Cl.$^7$ ............................................. E21B 33/13
(52) U.S. Cl. ...................... 507/211; 507/269; 166/293; 166/295; 106/638; 106/713; 106/789
(58) Field of Search ................................. 507/211, 269; 166/293, 295; 106/638, 713, 789

(56) References Cited

U.S. PATENT DOCUMENTS

| | | | | | |
|---|---|---|---|---|---|
| 2,878,875 | A | * | 3/1959 | Dunlap et al. | 166/293 |
| 3,131,075 | A | * | 4/1964 | Brooks, Jr. | 106/726 |
| 3,145,774 | A | * | 8/1964 | Patchen | 166/293 |
| 3,885,985 | A | * | 5/1975 | Serafin et al. | 106/820 |
| 5,499,677 | A | * | 3/1996 | Cowan | 166/293 |
| 5,580,379 | A | * | 12/1996 | Cowan | 106/789 |

FOREIGN PATENT DOCUMENTS

| | | | |
|---|---|---|---|
| WO | 94/28085 | * | 12/1994 |
| WO | 98/56868 | * | 12/1998 |
| WO | 98/56869 | * | 12/1998 |

* cited by examiner

*Primary Examiner*—Philip C. Tucker
(74) *Attorney, Agent, or Firm*—Thomas O. Mitchell; Robin Nava; Brigitte L. Echols

(57) ABSTRACT

A plugging fluid for plugging a subterranean formation zone surrounding a drill hole consisting of an emulsion comprising an oil phase containing an oil, an emulsifier and 2.4 to 4 kg of cement per liter of oil and an aqueous phase containing water and 12–16 g of polysaccharide per liter of water, wherein the oil to water volume ratio ranges from 20:80 to 25:75. Upon shearing, the emulsion inverts so that the rupture of the emulsion droplets releases the cement into the water phase thus providing metallic divalent ion to crosslink with the polysaccharide and forming a gel structure.

13 Claims, No Drawings

SHEAR-SENSITIVE PLUGGING FLUID FOR PLUGGING AND A METHOD FOR PLUGGING A SUBTERRANEAN FORMATION ZONE

The present invention relates to a reactive plugging fluid designed to gel rapidly when subjected to high shear stress. The invention also relates to a method for plugging a subterranean formation zone, especially for curing massive mud losses when drilling a well.

Lost circulation while drilling is a major problem. The well cost dramatically increases due to the lost time from delayed well production and also due to associated drilled problems such as pipe sticking and safety issues. The most common technique to combat lost circulation is to add into the drilling fluid a lost circulation material (LCM). Granular flakes and fibrous particles, essentially based on cellulosic materials, are used for sealing off fractures, vugs and porous zones. Minerals such as mica are also commonly used. If even high concentrations of lost circulation materials fail to restore the drilling fluid circulation, a cement plug is placed. The cement plug consolidates the voids but also fills the open wellbore and needs to be drilled before continuing the well drilling. Quite often, the procedure must be repeated several times before achieving a correct seal.

Other techniques involve the use of reactive fluids. Two reactive fluids are either mixed near the formation where lost occurs with a first fluid pumped through the drill-string and a second fluid displaced down the annulus. At the interface of the two fluids, the turbulent flow allows the rapid formation of a rubbery solid mass commonly known as a gunk. Another practice uses crosslinked polymer gels whose reaction is initiated on surface. In both case, the technology is highly risky since slight changes in the composition, temperature or fluid contamination may lead to premature gellation in and around the bottom hole assembly, leading to major operation failure.

It is also known to use as plugging fluids so-called rheotropic liquids that thicken when subjected to high stress. U.S. Pat. No. 4,663,366 discloses such a polycarboxylic acid containing water-in-oil emulsion where the oil phase contains hydratable water-swelling hydrophilic clay such as bentonite and the aqueous phase contains a dissolved polyacrylamide and a polycarboxylic acid. The setting of this plugging fluid takes place as a result of a swelling of the bentonite when bentonite contacts water. Each dispersed droplet of the aqueous phase is coated with a polymeric material so that the contact only occurs when the emulsion is subjected to high shear forces that break this coating.

Another rheotropic plugging fluid is known from WO94/28085. Like the emulsion of the U.S. Pat. No. 4,663,366, the fluid is based upon a 'loose' invert emulsion. The continuous phase provides an encapsulation medium for a crosslinker and the internal phase consists of a high concentration of a polymer while the interfacial tension between the two phases is maintained by a concentration of a lipophilic surfactant A preferred plugging fluid of the WO94/28085 patent application consists of about 25% by volume of a continuous phase containing an hydrophobic liquid selected from mineral oils, vegetable oils, esters and ethers, an emulsifier on a triglyceride basis, bentonite and calcium hydroxide and of about 75% by volume of a dispersed aqueous phase containing water, xanthane and optionally, a weighting material such as barite. When this type of fluid experiences a significant pressure drop, an inversion of the emulsion occurs and the crosslinker is released into the aqueous phase resulting in the formation of a gel.

This latter type of plugging fluid can be stored for several weeks without reacting and pumped with a centrifugal pump for several hours. Gellation is fast and triggered only by subjecting the plugging fluid to high shear forces, for instance when forced through the drill bit. However, the use of this type of plugging fluid is limited by lack of robustness and shrinkage over time. Moreover, above a temperature threshold of about 90° C., the gel becomes less rigid and turns into a viscous fluid due to the breaking of the crosslinked bonds.

It would therefore be desirable to provide a new plugging fluid, which provides a more robust gel, both in the initial gel phase and in the days following. It would also be desirable to provide a plugging fluid with better thermal stability. There is also a need in well control for better procedures, including placement strategies to help in making jobs successful.

Thus, the invention provides a plugging fluid for plugging a subterranean formation zone surrounding a drill hole consisting of an emulsion comprising:
a. an oil phase containing
   an oil
   an emulsifier
   2.4–4 kg of cement per liter of oil
b. an aqueous phase containing
   water
   12–16 g of a polysaccharide per liter of water
wherein the oil to water volume ratio ranging from 20:80 to 25:75.

The emulsion is believed to be invert (water-in-oil) but is actually suspected to be direct (oil-in-water) with further water droplets within the large oil droplet, i.e. an invert emulsion in a direct emulsion.

The principle of the setting of the plugging fluid of the present invention is essentially the same as for the plugging fluid of WO94/28085 discussed above. It is the crosslinking of the polysaccharide that causes the gel formation. Polysaccharides are known as state-of-the-art polymeric viscosifiers used extensively in the oil industry. A crosslink bond is created between a metal ion and the hydroxyl groups along the polymer chain of the polysaccharides. Upon exposing the plugging fluid to a pressure drop greater than 2 MPa over a small dimension, it is believed that the emulsion inverts or flips from its invert state into a more stable direct state. The rupture of the emulsion droplets releases the cement into the water phase thus providing $Ca2+$ as metallic divalent ion to crosslink with the polysaccharides and forming the gel structure.

With time, it is believed that the rigid gel structure loses oil, probably through migration through the porous and high permeable gel structure. As the oil is removed and more cement particles become water-wet, the cement begins to hydrate and generate a low compressive strength over time. The strength developed by this material is orders of magnitude higher than the strength developed with cement-free emulsions and provides further strength to consolidate weak formations.

Advantageously, with an increase of the temperature, the removal of oil and thus the hydration of the water-wet particles seem to be accelerated. This translate into accelerating the gel into a more cementitious material which is more thermally stable at temperatures as high as 140° C.

The crosslink bond created between the metal ion and the hydroxyl groups concurs if the pH is ranged between 11 and 13. When the crosslinking agent is calcium hydroxide as preferred in the emulsion of WO-94/28085, such a high pH may be difficult to achieve with some problematic oils such as winter grade diesels that contain surfactants detrimental to gellation. Advantageously, the use of cement as crosslinking agent totally overcomes this difficulty since the pH is instantly increases as cement is added to the emulsion. Thus the addition of cement increases the protection from acidic effects and moreover, as the cement sets, it rends the system immune to pH changes and increases the resistance to mechanical effects by a factor of seven hundred when compared to a soft gel alone.

Any clean liquid hydrocarbon can be used for the oil phase. The oil may advantageously be selected from any base oil suitable for drilling fluids such as mineral oils, vegetable oils, esters and ether oils, diesel, alpha-olefins, polyolefines, n-alkanes, and mixtures thereof. Selected oils must be of compatible with the used drilling fluids and the environmental regulations that for instance prohibit use of aromatic containing oils on offshore rigs.

Conventional commercially available emulsifiers can be used, selected on the basis of their compatibility with alkali environment and the intended temperature of use. Lipophilic surfactants, used to prepare water-in-oil emulsion drilling fluids comprising a high water content (greater than 50% by volume) and known to those skilled in the art can provide the required emulsion strength. Preferred emulsifiers are based on combination of fatty acids and polyamides or on triglyceride. The setting time of the plugging fluid depends on the amount of emulsifier the addition of a small amount of emulsifier (less than 2–3 ml per liter of emulsion) will result in a very short setting time and a highly unstable emulsion. Conversely, large concentration, above 20 ml per liter of emulsion will result in a too stable fluid, a very long setting time and higher shear pressures required for gelling. A preferred plugging fluid comprises between 6 and 12 ml of emulsifier per liter of total fluid.

An increase amount of emulsifier increases the setting time and thus makes the fluid less sensitive to low shear.

The cement is advantageously a Portland Class A, Class G or Class H cement, commonly used for well cementing. Other cements such as micro cement, thixotropic cement, high gypsum cement have also been successfully tested though the qualitative results were not as good. Aluminous type cements should also be contemplated due to their ability at developing faster compressive strength and could help consolidate weak formations at low bottom hole temperature.

The used water is preferably fresh tap water but non contaminated drill water can also be used.

As mentioned above, polysaccharides are state-of-the-art polymeric viscosifiers in well control and will be selected in view of their good crosslinking properties and low viscosity before crosslinking. Most preferred polysaccharides are xanthanes.

The plugging fluid according to the present invention may optionally comprise additional additives such as a setting accelerator, lost circulation material and extenders.

By setting accelerator, it is understood a crosslinking agent containing divalent or trivalent metal ions, and preferably $Ca^{2+}$ provider such as calcium hydroxide (typically added at a concentration of less than 7 kg/m$^3$ of plugging fluid) to help providing $Ca^{2+}$ at the initial setting time and calcium chloride (typically added by 3% by weight of cement), a known cement accelerator that can be used to facilitate cement hydration. Both calcium hydroxide and calcium chloride have to be added to the oil phase of the plugging fluid.

If the system is intended to be used at intermediate temperature, typically between 90° C. and 120° C., it may be also interesting to use a mixture of calcium and zirconium.

Though it is not preferred, the plugging fluid may also comprise conventional lost circulation material such as nut plug, fibers, calcium carbonate, mica etc. If the plugging fluid is subjected to pass through the drill bit, then the lost circulation materials must be of fine or medium grade depending on the size of the jets at the bit.

Extenders such as clays are commonly used in wellbore fluid to improve the suspension of solids, to keep particulate solids, such as bridging agents, from separating. Bentonite is preferred due to its ability to absorb large amounts of water, thus preventing dilution of the gel by water influx. Bentonite further increases the gel strength of the slurry and improves the suspension of solids when lost circulation material is further included. Additionally, it provides improved fluid-loss control.

A preferred plugging fluid according to the present invention comprises per cubic meter of fluid: 133–166 liters of oil, 6–12 liters of emulsifier, 34 kg of polysaccharide, 600–700 kg of cement, 0–7 kg of calcium hydroxide and 466–500 liters of water.

The two phases of the emulsion may be prepared in two separate tanks by mixing the oil phase components in a first tank and by letting the polysaccharide hydrate in water in the second tank and adding the mixture of the first tank into the second tank under agitation.

According to a preferred variant of the present invention, the method for preparing the new plugging fluid comprises the steps of dissolving the emulsifier into the oil, adding cement to the oil and optionally, further adding the auxiliary calcium ions provider and finally, adding the polysaccharide to the agitated oil phase to prepare a pre-mix that comprises all the constituents of the emulsion but water. This pre-mix can be stored and leave on location until needed provided unplanned addition of water is prevented. When water is added to this pre-mix, an emulsion is created and the polysaccharide is transferred into the water phase where it begins to hydrate and generate further viscosity to the emulsion. All other solid materials in the emulsion remain in an oil-wet state.

The prepared emulsion is stable at ambient temperature during at least 6 hours if maintained under gentle agitation, preferably in paddle agitated batch tanks. Over-mixing will start gellation making pumping difficult.

One aspect of the present invention is a method for placing a plug in a well bore to treat lost circulation. The recommended practice after encountering a lost circulation zone is to treat the zone as soon as possible. The depth of the lowest lost circulation zone can be found by logging (for instance with imaging tools) or by plotting depth versus loss rate. Accurate location is a key to make sure that the plugging pill will be placed below the area of lost circulation. The pill is preferably pumped through the drill bit nozzles using pills having a volume of about 5–8 m$^3$. After the pumping of a first pill, the well is allowed to equilibrate and attempts should be made to attempt circulation. If full circulation is not obtained, then two or three pills may be needed to effectively seal the zone.

Though pumping of the plugging fluid through the drill bit nozzles is recommended, it is worth noting that the pill can be placed without a bit, by shearing it on surface. In this latter case, higher concentrations of emulsifier are required to delay the setting and ensure the pill can exit the pipe before gellation.

These and other features of the invention will become appreciated and understood by those skilled in the art from the detailed description of the following examples.

Preparation of the Emulsion.

A fluid pill was mixed consisting of 150 ml light mineral oil, 10 ml of commercially available lipophilic surfactant (EMUL HT available from Schlumberger Dowell), 3.5 g of Xanthan, 6.5 kg of Porland Class G cement and 480 ml of water.

The oil is placed in a vessel and agitated. To the agitated oil phase the lipophilic surfactant is added slowly until the surfactant is dissolved in the oil. Once dissolved, cement is added to the agitated oil. Xanthan is further added to the agitated oil phase. The agitated oil phase containing the chemicals is mixed for a further 5 minutes. The emulsion is formed by adding water to the agitated oil phase and the gel has been sheared. The gel setting occurs in about 3 minutes with a pressure drop of 2.7 MPa.

For comparative purpose, sample 2 with the same composition but without cement is also prepared.

The set gel was placed in an UCA chambers at Room Temperature. The UCA chamber was closed and heated from room temperature to the experimental temperature at a rate of 3.5° C./hr. Sample 1 was heated to 120° C. and 140° C., sample 2 was heated to 70° C.

Each sample was enclosed in the chamber under 20.7 MPa for a period of 72 hours. Samples were covered with a layer of water to reduce evaporation.

After 72 hours the cells were vented and cooled to room temperature. The materials were tested for their strength by exerting a strong finger pressure to the material. Observations were noted.

Sample 1: The material contains areas of weak gel strength and low to medium compressive strength.

Sample 2: The material has a higher compressive strength (highest of the 3 samples) and retains its shape from the UCA cell. No free water or bulk shrinkage was observed.

Sample 3 (prior art): A very strong emulsion is obtained that is too stable to shear forces so that the plugging never set. With slightly lower concentration of emulsifier, a weak gel was formed that broke towards 70° C.

What is claimed is:

1. A plugging fluid for plugging a subterranean formation zone surrounding a drill hole consisting of an emulsion comprising:
   a) an oil phase containing
      i. an oil
      ii. an emulsifier
      iii. 2.4–4 kg of cement per liter of oil; and
   b) an aqueous phase containing
      i. water; and
      ii. 12–16 g of a polysaccharide per liter of water;
   wherein the oil to water volume ratio ranges from 20:80 to 25:75.

2. The plugging fluid according to claim 1, further comprising a setting accelerator agent containing divalent or trivalent metal ions.

3. The plugging fluid according to claim 2, wherein said metal ions are $Ca^{2+}$.

4. The plugging fluid of any of claims 1–3, further comprising a clay extender.

5. A plugging fluid comprising per cubic meter of fluid:
   a) 133–166 liters of oil;
   b) 6–12 liters of emulsifier;
   c) 34 kg of polysaccharide;
   d) 600–700 kg of cement;
   e) 0–7 kg of calcium hydroxide; and
   f) 466–500 liters of water.

6. The plugging fluid of any of claim 5, further comprising a clay extender.

7. A method for preparing a plugging fluid comprising the steps of:
   a) dissolving an emulsifier into oil;
   b) adding cement to the oil to prepare a premix;
   c) adding a setting accelerator to the pre-mix;
   d) blending said pre-mix with water; and
   e) adding a polysaccharide to the pre-mix/water mixture.

8. A method of sealing a lost circulation zone in a wellbore comprising the step of:
   1) pumping a plugging fluid and initiating the gellation of the plugging fluid by shear forces, wherein said plugging fluid comprises:
      a) an oil phase containing
         i. an oil
         ii. an emulsifier
         iii. 2.4–4 kg of cement per liter of oil; and
      b) an aqueous phase containing
         i. water, and
         ii. 12–16 g of a polysaccharide per liter of water; and
      wherein the oil to water volume ratio ranges from 20:80 to 25:75.

9. The method of claim 8, wherein said plugging fluid further comprises a setting accelerator agent containing divalent or trivalent metal ions.

10. The method of claim 9, wherein said metal ions are $Ca^{2+}$.

11. The method of any of claims 8–10, wherein said plugging fluid further comprises a clay extender.

12. The method of claim 8, wherein the shear forces are applied through at least one drill bit nozzle.

13. The method of claim 8, wherein the shear forces are applied to the plugging fluid prior to pumping said fluid into the wellbore.

* * * * *